(12) United States Patent
Russ et al.

(10) Patent No.: US 10,639,741 B2
(45) Date of Patent: May 5, 2020

(54) ABLATION CUTTING OF A WORKPIECE BY A PULSED LASER BEAM

(71) Applicant: TRUMPF Laser- und Systemtechnik GmbH, Ditzingen (DE)

(72) Inventors: Simone Russ, Rottweil (DE); Dennis Aalderink, Leonberg (DE)

(73) Assignee: TRUMPF Laser—und Systemtechnik GmbH, Ditzingen (DE)

( * ) Notice: Subject to any disclaimer, the term of this patent is extended or adjusted under 35 U.S.C. 154(b) by 155 days.

(21) Appl. No.: 14/980,061

(22) Filed: Dec. 28, 2015

(65) Prior Publication Data
US 2016/0129526 A1 May 12, 2016

Related U.S. Application Data

(63) Continuation of application No. PCT/EP2014/001770, filed on Jun. 27, 2014.

(30) Foreign Application Priority Data

Jun. 28, 2013 (DE) .................. 10 2013 212 577

(51) Int. Cl.
*B23K 26/0622* (2014.01)
*B23K 26/352* (2014.01)
(Continued)

(52) U.S. Cl.
CPC ...... *B23K 26/0622* (2015.10); *B23K 26/0869* (2013.01); *B23K 26/352* (2015.10);
(Continued)

(58) Field of Classification Search
CPC .............. B23K 26/0078; B23K 26/062; B23K 26/0622; B23K 26/0069; B23K 26/0869;
(Continued)

(56) References Cited

U.S. PATENT DOCUMENTS 4,598,039 A * 7/1986 Fischer .................... B44B 7/00
156/272.8
4,734,550 A 3/1988 Imamura et al.
(Continued)

FOREIGN PATENT DOCUMENTS

CN 102006964 A 4/2011
DE 102004055443 2/2012
(Continued)

OTHER PUBLICATIONS

The Free Dictionary, Definition for "Roughen". (Year: 2012).*
International Search Report from corresponding PCT Application No. PCT/EP2014/001770, dated Oct. 31, 2014, 6 pages.

*Primary Examiner* — Robert C Dye
*Assistant Examiner* — Sedef E Paquette
(74) *Attorney, Agent, or Firm* — Fish & Richardson P.C.

(57) ABSTRACT

A method for ablating a workpiece by a pulsed laser beam includes pretreating a workpiece surface of the workpiece by moving the pulsed laser beam over the workpiece surface along a surface path, first consecutive laser pulses of the pulsed laser beam having a first pulse overlap on the workpiece surface in a path direction, and ablating the pretreated workpiece surface by moving the pulsed laser beam over the workpiece surface along the surface path multiple times. The second consecutive laser pulses of the pulsed laser beam have a second pulse overlap on the workpiece surface in the path direction, and the second pulse overlap is less than the first pulse overlap.

19 Claims, 2 Drawing Sheets

(51) Int. Cl.
*B23K 26/364* (2014.01)
*B23K 26/38* (2014.01)
*B23K 26/08* (2014.01)
*B23K 26/40* (2014.01)
*B23K 26/402* (2014.01)
*B23K 103/00* (2006.01)
*C03B 33/02* (2006.01)

(52) U.S. Cl.
CPC ........ *B23K 26/3584* (2018.08); *B23K 26/364* (2015.10); *B23K 26/38* (2013.01); *B23K 26/40* (2013.01); *B23K 26/402* (2013.01); *B23K 2103/50* (2018.08); *B23K 2103/54* (2018.08); *C03B 33/0222* (2013.01)

(58) Field of Classification Search
CPC .... B23K 26/352; B23K 26/364; B23K 26/38; B23K 26/40; B23K 26/402; B23K 2203/50; B23K 2203/54; B23K 26/0626; B23K 26/02; B23K 26/06; B23K 26/0673; B23K 26/0676; B23K 15/004; C03B 33/0222; C03B 33/082; C03B 33/0855; C03B 33/102; B29C 64/268; B29C 64/273
USPC .................................................. 264/1.37, 400
See application file for complete search history.

(56) References Cited

U.S. PATENT DOCUMENTS

| | | | |
|---|---|---|---|
| 4,857,699 A | 8/1989 | Duley et al. | |
| 6,552,301 B2 | 4/2003 | Herman et al. | |
| 7,179,723 B2 | 2/2007 | Genda et al. | |
| 8,361,828 B1 | 1/2013 | Patterson et al. | |
| 9,162,319 B2 | 10/2015 | Lubatschowski et al. | |
| 2002/0088780 A1* | 7/2002 | Boyle | B23K 26/40 219/121.69 |
| 2002/0190037 A1* | 12/2002 | Steur | H05K 3/0038 219/121.71 |
| 2002/0190435 A1 | 12/2002 | O Brien et al. | |
| 2005/0236378 A1* | 10/2005 | Boyle | B23K 26/0648 219/121.67 |
| 2006/0039419 A1* | 2/2006 | Deshi | H01C 17/242 372/9 |
| 2007/0090100 A1 | 4/2007 | Yonai et al. | |
| 2008/0160295 A1 | 7/2008 | Lappalainen et al. | |
| 2009/0045179 A1 | 2/2009 | Williams | |
| 2009/0294422 A1* | 12/2009 | Lubatschowski | B23K 26/38 219/121.72 |
| 2010/0276404 A1 | 11/2010 | Fukuhara et al. | |
| 2011/0021004 A1* | 1/2011 | Fukuyo | B23K 26/03 438/463 |
| 2011/0240617 A1* | 10/2011 | Xu | B23K 26/00 219/121.72 |
| 2012/0135177 A1 | 5/2012 | Cornejo et al. | |
| 2012/0211477 A1 | 8/2012 | Chacin et al. | |
| 2013/0273324 A1* | 10/2013 | Moll | C03C 23/0025 428/161 |
| 2014/0017447 A1* | 1/2014 | Kondo | H01L 23/544 428/141 |
| 2015/0028004 A1 | 1/2015 | Giese | |
| 2015/0079761 A1* | 3/2015 | Lei | H01L 21/78 438/462 |

FOREIGN PATENT DOCUMENTS

| | | | |
|---|---|---|---|
| DE | 102012205702 | 5/2013 | |
| DE | 102012205702 B3 * | 5/2013 | .......... F16C 33/7826 |
| EP | 1945401 | 4/2012 | |
| EP | 2258512 B1 | 8/2012 | |
| JP | 2006035710 A | 2/2006 | |
| JP | 2008062285 A | 3/2008 | |
| JP | 2010-274238 | 12/2010 | |
| WO | WO2009117451 A1 | 9/2009 | |
| WO | WO2012006736 A2 | 1/2012 | |
| WO | WO2012112342 A2 | 8/2012 | |
| WO | WO2014206572 A1 | 12/2014 | |

* cited by examiner

ABLATION CUTTING OF A WORKPIECE BY A PULSED LASER BEAM

CROSS-REFERENCE TO RELATED APPLICATIONS

This application is a continuation of and claims priority under 35 U.S.C. § 120 to PCT Application No. PCT/EP2014/001770 filed on Jun. 27, 2014, which claimed priority to German Application No. DE 10 2013 212 577.1, filed on Jun. 28, 2013. The contents of both of these priority applications are hereby incorporated by reference in their entirety.

TECHNICAL FIELD

The invention relates to methods for ablation or ablation cutting of a workpiece by a pulsed laser beam, particularly where workpiece material is removed consecutively from the workpiece by the pulsed laser beam.

BACKGROUND

When using a laser to cut workpieces, in particular when laser cutting thin substrates out of, for example, glass, sapphire or similar materials, damage is known to occur not only in the immediate vicinity of the material ablation on the upper side of the workpiece facing the laser beam, but also so-called secondary processing zones normally at some distance can form inside the workpiece material or on the underside of the workpiece, in which the workpiece material is damaged by the laser process (e.g., modified locally such as melted). The cause of the formation of these secondary processing zones is assumed to be, amongst other things, undesired optical effects, such as reflections of the laser beam when laser cutting inside the optically transparent workpiece material being cut. The extent to which the secondary processing zones are formed varies also depending on the material and/or on the dimensions of the workpiece, as well as on the process parameters used in the laser cutting.

The secondary processing zones described above form not only an optical defect in the processed workpiece, but they also affect its stability disadvantageously. For example, the mechanical resilience of the processed workpiece is lowered by the secondary processing zones and consequently in particular the maximum bearable bending stress (bending stress to fracture) of the workpiece is reduced. The further the damage is from the actual cutting region, the less pronounced it is as a rule.

In order to reduce the effect of the material processing on a region adjacent to the actual processing region, EP 1 945 401 B1 provides a method of material separation which uses a laser, where the material region being processed is irradiated with a series of laser pulses. In doing so, the region irradiated by at least two consecutive laser pulses can overlap spatially in the region by 10% to 99%. When cutting through the workpiece along a kerf, at the start of the separation process, initially high laser energy is applied, after which the laser energy is reduced.

EP 2 258 512 B1 provides a method and a device for separating a substrate, where multiple pulses are aimed at the substrate which are able to melt out the substrate locally. By so doing, a structurally weaker region is formed in the interior of the substrate wherein the individual laser pulses can overlap each other spatially. Then, the substrate can be separated (broken) or cut by mechanical action in the weakened region.

U.S. Pat. No. 6,552,301 B2 discloses a method in which a series of laser pulses are fired at a workpiece material. Here, the laser pulses have a very short pulse duration and a flow density which exceeds a threshold to modify the workpiece material.

WO 2012/006736 A2 provides a method for preparing a splitting of a substrate, where the substrate is irradiated with one or multiple laser pulses, so that initially a first filament appears in the substrate. By having a relative movement between substrate and laser beam, a second additional filament is produced at another place in the substrate, so that the filaments form a pattern along which the substrate is split.

SUMMARY

One aspect of the invention features a method including the following steps: a) pretreating the workpiece surface by moving a pulsed laser beam over the workpiece surface along a surface path, consecutive laser pulses of the pulsed laser beam having a first pulse overlap on the workpiece surface in the path direction; and b) ablating the pretreated workpiece surface by moving the pulsed laser beam over the workpiece surface along the surface path multiple times, consecutive laser pulses of the pulsed laser beam having a second pulse overlap on the workpiece surface in the path direction, the second pulse overlap being less than the first pulse overlap. By the method, the formation of secondary processing zones or, respectively, damage zones can be ideally totally prevented or at least reduced.

The workpiece can be a transparent workpiece. By pretreating the workpiece surface in the first step a), the transmission of the workpiece region near the surface can be reduced by, for example, roughening the workpiece surface by the intensive laser irradiation. In the workpiece region near the surface scatter centres are created which prevent the laser irradiation in the second step b), now with a lower route energy, from being able to penetrate the transparent workpiece material located underneath the pretreated workpiece surface and, in particular, from being able to penetrate further as far as the underside of the workpiece, which might cause undesirable damage or modifications to the workpiece material. In this case, the route energy is defined as the laser power divided by the feed speed. In particular, the formation of damaging reflections in the transparent workpiece material during the laser cutting can be prevented, or reduced, so that no damage or just reduced damage of the workpiece occurs in the region of the cut or away from it. Also, the formation of a damage zone on the reverse side of the workpiece can be prevented. Thus, rework of the cut sides is superfluous or at least minimised. Moreover, the stability, in particular the bending strength, is increased by the method for cutting workpieces.

The method represents to an extent a hybrid process including the first step where the workpiece is pretreated locally, and the second step when the actual cutting of the workpiece takes place. In the method, using the laser beams with varying pulse overlapping, the material is removed in layers from the surface of the workpiece increasingly deeper into the workpiece. In doing so, the laser parameter "pulse overlap", calculated by the formula below:

$$\ddot{U} = 1 - \frac{v}{f\, d_{0f}}$$

where: Ü=pulse overlap [%],
v=feed speed [m/s],
f=pulse frequency of the laser beam [Hz],
and
$d_{0f}$=focus diameter [m],
is lowered from an initially comparatively high value for the pretreatment of the workpiece following along the later cutting contour to a substantially lower value for cutting the workpiece material. To do this, the feed speed, for example, of the laser beam can be raised, while maintaining the pulse frequency of the laser beam, from the first to the second step, or the pulse frequency of the laser beam can be reduced while maintaining the feed speed.

The workpieces to be cut involve, in particular, thin, transparent substrates, such as glass, sapphire or similar material with thicknesses up to a maximum of 1 mm. The active depth of the laser beams when pretreating the workpiece along the surface path in the first step can be 10 µm to 20 µm. The deepening of the pretreated workpiece surface to form a groove (kerf) in the second step is performed through the remaining thickness of the workpiece or substrate to be cut. A laser with a pulse duration, or pulse width in the picosecond range can be used to generate the pulsed laser beam. The method can be performed by a laser processing machine with a pulsed laser, wherein a control program can be used which can vary the specified parameters (feed speed, pulse frequency, focus diameter, laser power, number or overmovements, etc.). The laser beams can be generated with the same laser in the first step and in the second step. In a particular example, in each of the first and in the second steps the laser pulses have the same pulse power and the same diameter on the workpiece surface.

Depending on the workpiece material to be cut and its geometry, the method can be designed to produce wider tracks or wider grooves to cut through the workpiece. To widen the pretreated surface path, in the first and/or in the second step the pulsed laser beam can be moved over the workpiece surface in the path direction in multiple surface paths offset laterally from each other, overlapping each other in the transverse direction.

In some examples, in the first step the first pulse overlap is more than 90%, in particular more than 95%, and in the second step the second pulse overlap is less than 70%, in particular less than 50%. At the same laser pulse power and at the same laser beam diameter on the workpiece surface, in the second step, therefore, only about half as much laser power is applied into the workpiece as in the first step.

In some cases, in the first step the laser beam is moved over the workpiece no more than twice to prevent a too high input of energy and consequently a too high amount of thermal or thermo-mechanical stress of the workpiece.

In order to cut through the workpiece, the second step can be repeated sufficiently often until the workpiece is either parted completely along the surface path or can be parted by a mechanical ablation process, in particular by a scratching process.

In a variant of the method, the first and second steps are carried out on both sides of the workpiece to produce a groove (kerf) on both sides which helps to achieve a complete parting cut. Compared with processing only one side of the workpiece, this method is able to achieve a faster cut through the workpiece, requiring less material ablation.

In particular, the width of the groove on both sides of the workpiece can be selected to be smaller than in the case of one-sided processing. Processing both sides of the workpiece can be done essentially at the same time using two lasers. In some examples, the first and second steps are carried out first on the one side of the workpiece, then on the other reverse side of the workpiece. In this way, the workpiece can be processed on both sides by just a single laser. In this case, to cut through the workpiece particularly quickly, the first and second steps are carried out on the one side of the workpiece down to a groove depth of 50% of the workpiece thickness and then, after turning the workpiece over, on the other side of the workpiece until the two grooves are completed to produce a separation cut and the workpiece is cut through.

Further advantages and advantageous embodiments of the subject matter of the invention emerge from the description, the claims and the drawing. Furthermore, the features described above and those described below can be applied as such or severally in any desired combinations. The illustrated and described embodiments are not to be taken as a definitive list but, instead, are exemplary in nature for the depiction of the invention. The figures of the drawing show the subject matter of the invention in a very diagrammatic manner and are not to be regarded as being to scale.

DETAILED DESCRIPTION

FIGS. 1A to 1D illustrate the individual steps of an example ablation cutting of a workpiece 1, e.g., an optically transparent workpiece, by a pulsed laser beam 2.

Figure 1A:
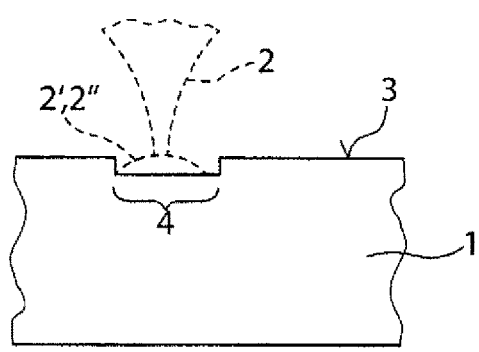
FIGS. 1A-1D show individual steps of an example ablation method in a cross-sectional view through a workpiece.
Figure 2A:
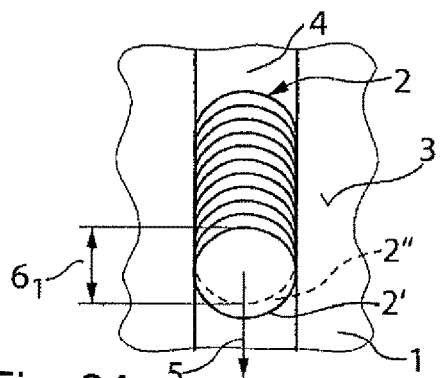
FIGS. 2A-2D show two pulse sequences with differing pulse overlaps using an example ablation method in a top view over a workpiece.
Figure 1B:
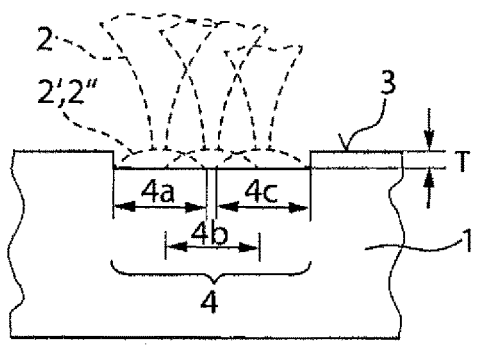

In a first step shown in FIG. 1A, the pulsed laser beam 2 is moved over the workpiece surface (upper side of the workpiece) 3 along a surface path 4 (FIG. 2A) and is pretreated thereby for the actual ablation. The pretreatment reduces the transmission of the workpiece region near the surface by, for example, roughening the workpiece surface 3 by the laser beam 2. As shown in FIG. 2A, in the first step consecutive laser pulses 2', 2" of the pulsed laser beam 2 have a first pulse overlap $6_1$ on the workpiece surface 3 in a path direction 5 of, for example, 95%, so that consecutive pulses 2', 2" overlap to a large extent.

Figure 2B:
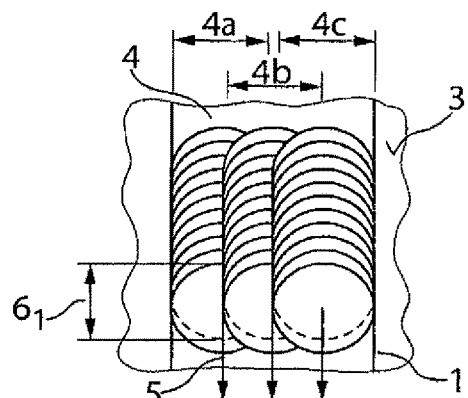

To widen the pretreated surface path 4 to a path width enabling the workpiece 1 to be cut through, the pulsed laser beam 2 is moved over the workpiece surface 3 and with the first pulse overlap $6_1$ in the path direction 5 in multiple surface paths 4a-4c (FIG. 1B) offset laterally from each other, overlapping each other in the transverse direction (linear overlap), as shown in FIG. 2B.

In the first step, the pulsed laser beam 2 with the first pulse overlap $6_1$ acts typically down to a depth T of 10 µm to 20 µm by removing or melting substrate material to this depth T. In order to restrict the thermal energy input into the workpiece 1 along the surface path 4 during the pretreatment and, therefore, to prevent damage, in particular cracks, in the workpiece 1, in the first step the pulsed laser beam 2 is moved over the same place on the workpiece surface 3 no more than twice.

Figure 1C:
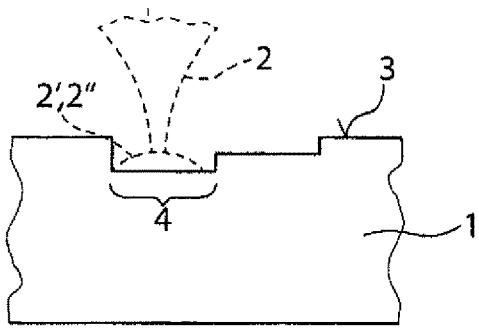
Figure 2C:
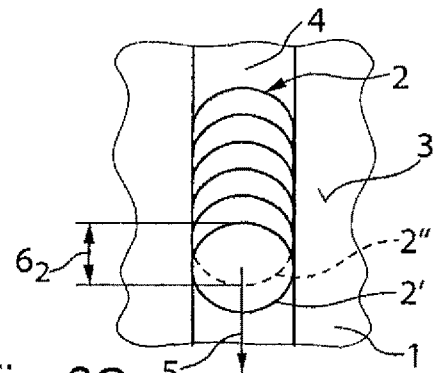

In a second step shown in FIG. 1C, ablation of the pretreated workpiece surface 3 takes place by moving the pulsed laser beam 2 over the workpiece surface 3 multiple times along the surface path 4. As shown in FIG. 2C, in the second step consecutive laser pulses 2', 2" of the pulsed laser beam 2 on the workpiece surface 3 in the path direction 5 have a second pulse overlap $6_2$ of, for example, 55% which is smaller compared with the first pulse overlap $6_1$. With the same laser pulse power of the laser beam 2, the second pulse overlap $6_2$ can be achieved, if the same pulse frequency is kept constant, by a feed speed, higher than in the first step, of the laser beam 2 on the workpiece surface 3, or, if the feed speed is kept constant, by a pulse frequency which is lower compared with the first step.

Figure 1D:
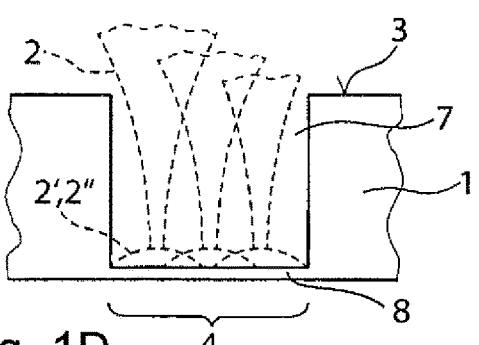
Figure 2D:
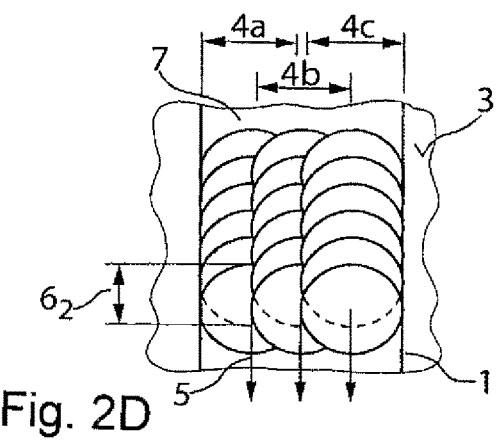

As shown in FIG. 1D, similar to the first step, the pulsed laser beam 2 with the second pulse overlap $6_2$ is moved over the workpiece surface 3 in the path direction 5 in multiple surface paths 4a-4c offset laterally from each other, overlapping each other in the transverse direction (linear overlap), as shown in FIG. 2D.

The second step is repeated until a groove 7 is formed initially in the workpiece surface 3 by material ablation (FIG. 1D, 2D) and, after several hundred moves thereover, the workpiece 1 is finally cut through completely. As an alternative to completely cutting through by the laser beam 2, a groove bottom 8 still present in the workpiece 1 can be broken through completely also by a mechanical ablation method, in particular by a scratching process.

By pretreating the workpiece surface 3 in the first step, in the second step this effectively avoids the laser beam 2 being able to penetrate the workpiece material located underneath the pretreated workpiece surface 3 and, in particular, being able to advance to the underside of the workpiece which might cause undesired damage or modifications to the workpiece material.

In FIGS. 3A to 3E, individual steps of a variant of the ablation method are shown.

Figure 3A:
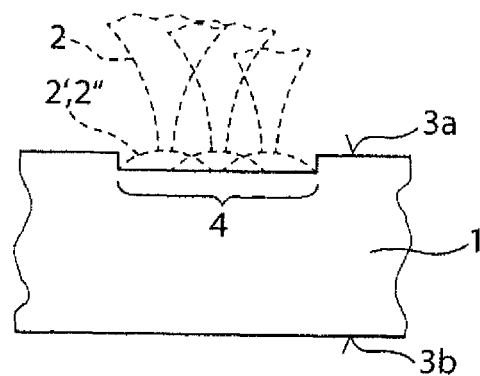
FIGS. 3A-3E show individual steps of another example ablation method in a cross-sectional view through a workpiece.
Figure 3B:
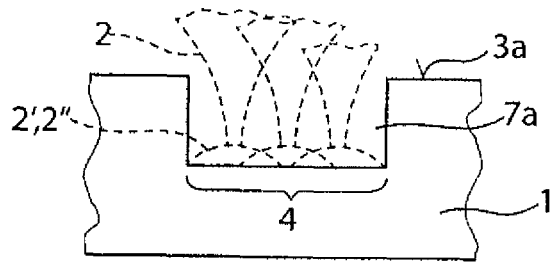

Firstly, the first side 3a of the workpiece facing the laser beam 2 is processed in accordance with the first and second steps as the pulsed laser beam 2 with the first pulse overlap $6_1$ is moved over the first side 3a of the workpiece along the surface path 4 and is thereby pretreated for the actual ablation (FIG. 3A), following which, a first groove 7a is cut in the first side 3a of the workpiece by material ablation by the pulsed laser beam 2 with the second pulse overlap $6_2$ (FIG. 3B).

Figure 3C:
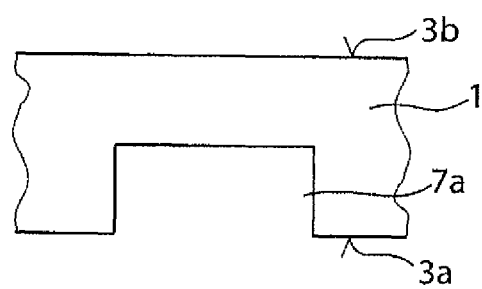
Figure 3D:
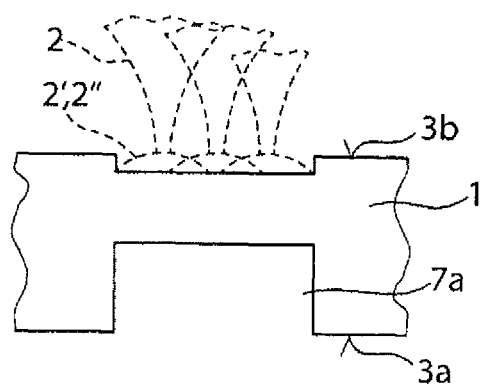

When the first groove 7a has been cut into the workpiece 1 to about a half of the thickness of the workpiece, the workpiece 1 is turned over (FIG. 3C).

Figure 3E:
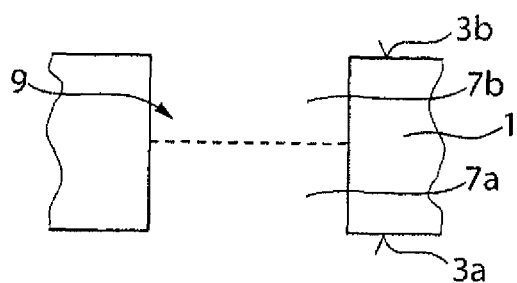

The second side 3b of the workpiece now facing the laser beam 2 is processed in accordance with the first and second steps as the pulsed laser beam 2 with the first pulse overlap $6_1$ is moved over the second side 3b of the workpiece along the same surface path 4 and is thereby pretreated for the actual ablation (FIG. 3D), following which, a second groove 7b is cut in the second side 3b of the workpiece by material ablation by the pulsed laser beam 2 with the second pulse overlap $6_2$. The second groove 7b is cut sufficiently deeply to result in a complete separation cut 9 being achieved (FIG. 3E).

A number of embodiments of the invention have been described.

Nevertheless, it will be understood that various modifications may be made without departing from the spirit and scope of the invention. Accordingly, other embodiments are within the scope of the following claims.

What is claimed is:

1. A method of parting an optically transparent workpiece, the method comprising:
    pretreating a workpiece surface of the optically transparent workpiece by moving a first pulsed laser beam at a first constant speed over the workpiece surface along a pretreating surface path with a particular path width, wherein first consecutive laser pulses of the first pulsed laser beam have a first pulse overlap on the workpiece surface in a path direction; and
    ablating the pretreated workpiece surface of the optically transparent workpiece by moving a second pulsed laser beam at a second constant speed over the pretreated workpiece surface along the pretreating surface path with the particular path width multiple times, wherein second consecutive laser pulses of the second pulsed laser beam have a second pulse overlap on the workpiece surface in the path direction, and wherein the second pulse overlap is less than the first pulse overlap,
    wherein pretreating the workpiece surface comprises moving the first pulsed laser beam over the workpiece surface along a first plurality of surface paths in the path direction, the first plurality of surface paths being offset laterally from each other and overlapping laterally with each other, and
    wherein ablating the pretreated workpiece surface comprises moving the second pulsed laser beam over the workpiece surface along a second plurality of surface paths in the path direction, the second plurality of surface paths being offset laterally from each other and overlapping laterally with each other.

2. The method of claim 1, wherein the first consecutive laser pulses and the second consecutive laser pulses have a same pulse power and a same diameter on the workpiece surface.

3. The method of claim 1, wherein the first and second pulse overlaps are achieved by changing at least one of a pulse frequency or a feed speed.

4. The method of claim 1, wherein the first pulse overlap is more than 90%.

5. The method of claim 4, wherein the first pulse overlap is more than 95%.

6. The method of claim 1, wherein the second pulse overlap is less than 70%.

7. The method of claim 6, wherein the second pulse overlap is less than 50%.

8. The method of claim 1, wherein pretreating a workpiece surface of the optically transparent workpiece comprises:
    moving the first pulsed laser beam over the workpiece surface along the surface path no more than twice.

9. The method of claim 1, wherein the first pulsed laser beam and the second pulsed laser beam are generated with a same laser.

10. The method of claim 1, wherein pretreating a workpiece surface of the optically transparent workpiece comprises:
    reducing transmission of a workpiece region near the workpiece surface.

11. The method of claim 10, wherein pretreating a workpiece surface of the workpiece comprises:
    roughening the workpiece surface by the first pulsed laser beam.

12. The method of claim 1, wherein ablating the pretreated workpiece surface of the optically transparent workpiece comprises:
repeating the ablating for a plurality of times until the optically transparent workpiece is parted completely along the surface path.

13. The method of claim 1, further comprising:
parting the optically transparent workpiece completely on the ablated workpiece surface by mechanical ablation.

14. The method of claim 13, wherein the mechanical ablation includes a scratching process.

15. The method of claim 1, further comprising:
carrying out the pretreating and ablating on both sides of the optically transparent workpiece along the same surface path.

16. The method of claim 15, further comprising:
carrying out the pretreating and ablating on a first side of the optically transparent workpiece along the surface path; then
carrying out the pretreating and ablating on a second, reverse side of the optically transparent workpiece along the same surface path.

17. The method of claim 16, further comprising:
turning the optically transparent workpiece over after carrying out the pretreating and ablating on the first side of the optically transparent workpiece,
wherein a single laser is used for carrying out the pretreating and ablating on the first side and on the second side.

18. The method of claim 1, wherein the first and second pulse overlaps are achieved by increasing the first constant speed to the second constant speed while keeping a pulse frequency of the second pulsed laser beam to be the same as a pulse frequency of the first pulsed laser beam.

19. The method of claim 1, wherein the first and second pulse overlaps are achieved by reducing a first pulse frequency of the first pulsed laser beam to a second pulse frequency of the second pulsed laser beam while keeping the second constant speed to be the same as the first constant speed.

* * * * *